Patented July 31, 1945

2,380,466

UNITED STATES PATENT OFFICE 2,380,466

PLASTIC COMPOSITIONS AND METHOD OF MAKING THE SAME

Orland M. Reiff and John D. Zech, Woodbury, N. J., assignors to Socony-Vacuum Oil Company, Incorporated, New York, N. Y., a corporation of New York No Drawing. Application February 28, 1942, Serial No. 432,792

4 Claims. (Cl. 260—48)

This invention relates to plastic compositions of matter and to methods for making the same and is particularly concerned with a process including alkylation of aromatics with long chain aliphatic groups, causing the aliphatic groups to contain halogen substituents, and dehalogenating by reaction with sulphides to substitute sulphur for the halogen in the molecule. This invention also comprises the improved compositions of matter so prepared.

In general, the first step of the process, alkylation, is preferably conducted in accordance with the disclosures in application Serial No. 422,588, filed January 21, 1942, by O. M. Reiff and J. J. Giammaria; and application Serial No. 423,580, filed December 19, 1941, by E. P. Otto and O. M. Reiff, issued February 1, 1944 as Patent No. 2,340,838. The said disclosures relate to condensation of aromatics with chlorinated aliphatics in the presence of Friedel-Crafts catalysts. The products of the first of said applications are plastic and rubber-like compositions resulting from reaction of chlorinated waxes of at least 25% chlorine content with aromatic material in proportions to polyalkylate the aromatics; while those of the latter application are hard resinous bodies produced by reaction of the chlorinated aliphatics having more than 10 carbon atoms and containing from 40% to 60% chlorine with aromatic material in proportions such that there is present at least one mol of aromatic for each atomic weight of chlorine in the chlorinated aliphatic. By applying the principles of this invention to either of those compositions, the properties thereof may be extensively modified, rendering them more suitable for many of the purposes to which they are adapted and modifying their characteristics to adapt them to further uses.

The invention is not limited to compositions of the type described in the two said applications, however, but may be utilized in connection with any plastic body wherein the characterizing component is an alkaryl or aralkyl composition within the ranges discussed below. It will be seen, as the description of the invention develops, that superior results are obtained with certain plastic and rubber-like compositions described in the said application of Reiff and Giammaria because of the greater toughness and elasticity imparted thereto by the present process. Other plastic compositions of the types set out above are modified similarly to give greater toughness and/or tensile strength or advantageous changes in related properties.

In preparation of the alkylated aromatic compound, molecular weight and degree of chlorination of the aliphatic to be substituted on the aromatic nuclei are of primary importance. The degree of substitution, governed by the relative molecular ratios of aromatic compound to combined chlorine are to be considered as governing to a large extent the properties of compositions within the scope of the invention. The aliphatic compounds used for alkylation are preferably derived from petroleum or other mineral wax, although other waxes and aliphatic compounds having a fairly high molecular weight may be employed. Stoddard solvent, for example, may be chlorinated and reacted with an aromatic to produce a suitable composition. In general, the aliphatic material used, usually a mixture of several aliphatic compounds, should be composed primarily of a compound or compounds having at least 10 carbon atoms. Better results are usually obtained by using petroleum waxes which average about 24 carbon atoms per molecule and have few, if any, components below 20 carbon atoms per molecule, although compounds having as few as 15 carbon atoms have been reported as being present in typical petroleum waxes.

The degree of chlorination of the aliphatic material is a factor controlling hardness and/or resiliency of the finished product, the hardness increasing and the resiliency decreasing as the degree of chlorination is increased. The degree of substitution also affects these and other properties. Mono-alkylated aromatics usually show a more resinous character, while the poly-alkylated materials are more resilient. In general, the oxy-aromatic compounds, such as phenol, the naphthols and diphenyl ether produce more elastic products than the aromatic hydrocarbons and other derivatives of mono-cyclic, or poly-cyclic aromatics. Having reacted the chlorinated aliphatic and the aromatic material, as by a Friedel-Crafts reaction between the aromatic and chlorinated aliphatic reactants the product of that reaction is further treated with a sulphide to replace the remaining halogen to a greater or lesser extent by sulphur.

Although products of the type above noted generally contain some chlorine because of incomplete reaction, the amount of chlorine remaining will usually not exceed about 2% by weight. In order to form a wax aromatic compound, particularly of the wax phenol type, completely free of chlorine, it is necessary to run a prolonged reaction which results in some cracking of the substituted wax groups and the formation of a product of lower viscosity and of less desirable characteristics.

According to the present invention, a higher amount of halogen is intentionally allowed to remain in the Friedel-Crafts reaction product or introduced thereafter by halogenating the wax aromatic compound, followed by heating with a sulphide, after decomposition or removal of the AlCl₃ catalyst. By this procedure, an improved composition is obtained. The product has higher tensile strength as a rubber-like composition and greater toughness and durability as a hard plastic material.

PREPARATION OF THE PLASTIC AND RUBBER-LIKE COMPOSITIONS

In the following examples, procedures will be given for the formation of the halogen-containing wax aromatic compounds as division $a$; and the sulphide treatment step will be outlined as part $b$.

EXAMPLE I (a) *Halogen-containing wax aromatic compounds*

A rubber-like composition comprising a chlorine-containing wax phenol prepared as outlined below by tri-substitution of phenol with wax of 27% chlorine content will have a phenol content of about 25%, a chlorine content of about 7%, the remainder of the molecule consisting of combined wax. The compositions may be represented by the following general formula which is not an attempt to give, however, an exact representation of the molecule. For simplicity, the different aromatic nuclei are represented by the phenyl radical.

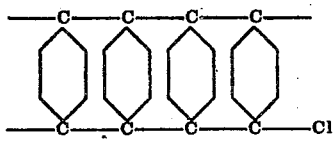

The compositions are represented in the foregoing formula with a single attachment of the aromatic group to each wax group, but in the reaction of chlorwax of high chlorine content with aromatic compounds, as carried out in the preparation of certain of the plastic and rubber-like compositions, apparently the aromatic group will be attached in some cases to more than one carbon of the same wax group, particularly in reactions with aromatic compounds of the condensed nuclei and poly-cyclic type.

Some chain formation would be expected to occur in the reaction of aromatic compounds with chlorinated waxes, in which case the following representation would be applicable, → representing a continuation of the chain structure.

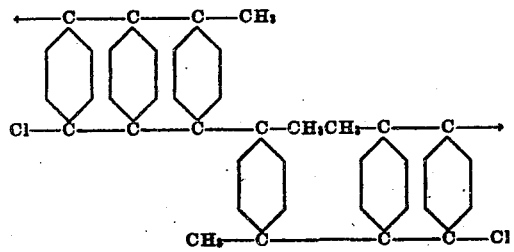

The halogen is represented in the foregoing formulae as an end carbon substituent, but the position of the halogen group is undeterminable, except that it is substituted in the aliphatic group. The compositions are represented as di-alkyl substituted aromatic compounds, but an amount of chlorwax can be reacted which is sufficient to substitute all the replaceable hydrogen of the aromatic nuclei. Generally, an amount of chlorwax sufficient to at least tri-substitute the aromatic compound is favored. Chlorinated wax of 50% chlorine content can be prepared conveniently. This degree of chlorination of the wax can be used in formation of the plastic and rubber-like compositions, but will require the use of a powerful mixer because of the high viscosity of the mixture obtained. A tough, rubber-like product results during the formation of the wax phenol, described below, containing 5% chlorine, which can be carried out in ordinary laboratory reactors of glass.

PREPARATION OF WAX PHENOL CONTAINING CHLORINE

*Reaction mixture*

| | |
|---|---|
| Phenol | g 72 |
| Chlorinated wax of 27% chlorine content | g 300 |
| AlCl₃ (anhy.) | g 6 |

Paraffin wax of A.S.T.M. melting point of about 126° F. and of average molecular weight of about 350 is melted and a current of chlorine is introduced at a temperature of about 250° F. until 27% by weight of chlorine is absorbed. The phenol is then added, followed by addition of the anhydrous AlCl₃ at a temperature of about 190° F. with rapid stirring. The temperature of the mixture is gradually raised to about 350° F. during a one-hour period with efficient stirring to reduce foaming caused by evolution of HCl. The reaction mixture is then held at this temperature about one hour to bring about sufficient reaction.

It has been discovered that the reaction product, upon becoming highly viscous and difficult to stir, will break up into fine particles if allowed to stand with the temperature maintained at the point of high viscosity development. Hence, it is customary to discontinue stirring at the point of high viscosity, followed by renewed stirring at the point where break-up of the material occurs. High viscosity development in the formation of the present wax phenol occurs at about 325° F.

The reaction mixture is then cooled and contacted with water to decompose the aluminum chloride reaction product, whereby the aluminum chloride can be removed from the mixture. To ensure complete removal of any corrosive halogen, the product is digested with dilute (1%) caustic soda by refluxing the mixture several hours, followed by removing the alkaline solution and water washing or neutralizing with dilute hydrochloric or acetic acid. Aqueous ammonia can also be used in the removal of corrosive halogen, which is advantageous because of the readiness with which the ammonia can be removed after the digesting operation. During this purification, the product becomes coagulated and in this state can be formed into a sheet by running through squeeze rolls and further washing with water in this rolling operation. The rubber-like composition can be readily dried on a heated mill roll or can be cut into sheets and laid aside to dry.

In the foregoing procedure, the chlorine content of the finished product is controlled by the amount of AlCl₃ used as catalyst in the Friedel-Crafts reaction. As an alternative procedure, the chlorwax and phenol can be reacted in the presence of sufficient AlCl₃ to substantially eliminate the chlorine as HCl, followed by cooling the mixture, diluting with ethylene dichloride and introducing chlorine until the desired amount of halogen is absorbed. The reaction product is then purified as outlined above. This procedure is only applicable where the wax phenol is soluble in organic solvents, as for example a diwax phenol prepared from wax of 27% chlorine content.

(b) *Sulphurization of halogen containing wax aromatic compounds*

Chlorine-containing wax phenol, prepared as outlined in the foregoing, can be sulphurized by heating in the presence of agents such as aqueous alkaline sulphides, i. e., sulphides of the alkali metals and ammonia. Any method of sulphurization, however, results in the formation of sulphur derivatives having improved properties.

SULPHURIZATION OF WAX PHENOL CONTAINING 7¼% CHLORINE

*Reaction mixture*

Wax phenol (prepared as in (a) above)__g__ 195
Sodium sulphide in aqueous solution_____g__ 80

PROCEDURE

The chlorine-containing wax phenol from the Friedel-Crafts reactor is agitated with the sodium sulphide solution at a temperature of about 500° F. for a period of about 4 hours. In the sulphurization, the product is broken up into small particles which can be readily purified by water washing. The general procedure consists in removing the treating solution and water washing. The product is then milled into sheets by the procedure outlined above in the purification of the chlorine-containing wax aromatic compounds.

The more resinous or harder plastic compositions which can be formed from wax aromatic compounds such as diwax phenol from wax of 35% chlorine content, are also produced according to the foregoing procedure. The finished product, however, cannot be rolled into sheet form by milling operations and is handled in the form of a powder or small particle size for use as a molding composition. These products can be molded to give tough, resilient compositions of high fusion point without the aid of resinifying agents required in the formation of Bakelite products.

A rubber-like composition derived from the foregoing chlorine-containing wax phenol of Example I by sulphurization, will have a sulphur content of about 1.3%, a combined phenol content of about 25% and approximately 72% of combined wax. A small amount of halogen may remain because of incomplete dehalogenation, and the product will be more unsaturated because of loss of part of the halogen as HCl, resulting in the formation of double bonds.

When a hard plastic is formed by reaction of an aromatic compound with a chlorwax of higher chlorine content than the above, a product of higher aromatic content is formed. Diwax phenol from wax of 35% chlorine, for instance, containing 7.36% chlorine is converted into a hard plastic composition when sulphurized, having a phenol content of about 40% and a combined wax content of 55%, together with about 2% sulphur. The reaction of chlorine-containing wax-substituted aromatic compounds with sodium poly-sulphides, such as sodium tetrasulphide; and, alkali hydrosulphides, such as sodium hydrosulphide, is also contemplated. The reaction with such reagents is carried out according to the foregoing procedures.

EXAMPLE II

Three hundred grams of a chlorine-containing triwax phenol prepared from wax of 27% chlorine content is reacted with a solution of sodium tetrasulphide prepared by dissolving 50 grams of Na₂S.9H₂O and 20 grams of sulphur in 720 c. c. of water, by digesting the mixture in a stirring autoclave at a temperature of about 500° F. for a period of 2 hours. In the dehalogenation, the product is broken up into small particles from which the alkaline solution can be mostly removed by filtration. The general practice is to further water wash the material to completely remove any remaining sulphurizing agent. The material is then run through squeeze rolls to remove water and may be further washed in the operation. The rubber-like composition can be readily dried on a heated mill roll or can be cut into sheets and laid aside to dry.

The above rubber-like composition has a phenol content of about 25%, a sulphur content of 1.5% and a residual chlorine content of 2.2%, the remainder of the compound consisting of combined wax. The product will be more unsaturated because of the formation of double bonds of the dehalogenation, as noted in Example I.

EXAMPLE III

The formation of a hard resinous composition, instead of the soft rubber-like compositions of Examples I and II, may be illustrated by the dehalogenation of wax-substituted diphenyl containing chlorine. 488 grams of chlorwax containing 55% of chlorine is reacted with 198 grams of diphenyl by procedure a of Example 1, using 12 grams of AlCl₃ as catalyst and heating the mixture to about 300° F. and holding at this temperature about one hour and a half. Upon removal of the AlCl₃ by water washing, a low melting point resin is obtained analyzing about 25% chlorine. By reacting the product with an aqueous solution of sodium hydrosulphide, equivalent to the chlorine content at a temperature of 500° F. for 2 hours, a hard resinous product is obtained which, upon drying, can be molded to give a tough composition. A product of this kind analyzes about 3% chlorine and 4.4 sulphur.

In reacting the chlorine-containing wax aromatic compounds with sodium sulphides, a chain of wax aromatic nuclei inter-connected by sulphur linkages is believed to be the type of composition formed. Representing the wax aromatic constituent by W, the compositions may be represented by the following general formula:

It will be clear, of course, that any sulphurization of the halogen containing alkylated aromatic compounds will result in some modification of properties. In order to obtain marked modification, there should be removal of about 2% of halogen based on weight of the halogenated composition; while preferred compositions are prepared by removal of at least 5% by weight of halogen. The halogen may, as noted above, be caused to be present in the intermediate composition either by halogenating after the Friedel-Crafts reaction or by conducting that reaction in such manner as to result in residual halogen being present.

The preferred products, obtained by sulphurization of a halogenated composition resulting from the reaction of aromatics with halogenated aliphatic compounds of at least 20 carbon atoms and containing at least 25% of halogen in proportions to poly-alkylate, is admirably suited to uses to which rubber is put and vulcanizes very well; either alone or in combination with natural rubber.

We claim:

1. The process which comprises effecting formation of a plastic body containing combined halogen by heating chlorinated petroleum wax of at least 25% chlorine content with an aromatic compoud chosen from a group consisting of phenol, the naphthols and diphenyl ether in the presence of a Friedel-Crafts catalyst and thereafter sulfurizing said body by heating the same with an aqueous solution of an alkaline sulfide selected from the group consisting of alkali metal and ammonium sulfides; the combined chlorine removed from said body by said sulfurization being at least 2% by weight.

2. A composition of matter prepared by the process of claim 1.

3. The process which comprises effecting formation of a plastic body containing combined halogen by heating chlorinated petroleum wax of at least 25% chlorine content with phenol in the presence of a Friedel-Crafts catalyst and in a proportion of chlorinated wax to phenol such as to theoretically result in polyalkylation of the phenol, and thereafter sulfurizing said body by heating the same with an aqueous solution of an alkaline sulfide selected from the group consisting of alkali metal and ammonium sulfides; the combined chlorine removed from said body by said sulfurization being at least 2% by weight.

4. The process which comprises effecting formation of a plastic body containing combined halogen by heating chlorinated petroleum wax of at least 25% chlorine content with phenol in the presence of a Friedel-Crafts catalyst and thereafter sulfurizing said body by heating the same with an aqueous solution of an alkaline sulfide selected from the group consisting of alkali metal and ammonium sulfides; the combined chlorine removed from said body by said sulfurization being at least 2% by weight.

ORLAND M. REIFF.
JOHN D. ZECH.